US006216836B1

United States Patent
Illig et al.

(10) Patent No.: US 6,216,836 B1
(45) Date of Patent: Apr. 17, 2001

(54) HOUSING COMPONENT AND FRICTION SURFACE STRUCTURAL ASSEMBLY FOR A HYDRODYNAMIC CLUTCH DEVICE AND METHOD FOR THE PRODUCTION THEREOF

(75) Inventors: Roland Illig, Heustreu; Bernd Schöder, Münnerstadt; Ruthard Schneider, Bad Königshofen, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/362,815

(22) Filed: Jul. 28, 1999

(30) Foreign Application Priority Data

Jul. 8, 1999 (DE) .............................. 199 31 760

(51) Int. Cl.[7] .................................... F16H 45/02
(52) U.S. Cl. ................... 192/3.29; 192/107 R; 29/889.5
(58) Field of Search ................... 192/3.28, 3.29, 192/3.3, 70.14, 107 R, 107 M; 29/889.5; 148/111, 120

(56) References Cited

U.S. PATENT DOCUMENTS 5,095,727 * 3/1992 Westerman et al. .................... 72/122
5,553,693 * 9/1996 Schoder et al. ..................... 192/3.29

FOREIGN PATENT DOCUMENTS 44 23 640  6/1995 (DE) .............................. F16H/45/02

* cited by examiner

Primary Examiner—Richard M. Lorence
(74) Attorney, Agent, or Firm—Cohen, Pontani, Lieberman & Pavane

(57) ABSTRACT

A housing component for a hydrodynamic clutch device, especially a hydrodynamic torque converter, possesses a friction surface region for a converter lock-up clutch of the clutch device on a first side which is positionable for facing the interior of the clutch device. This housing component is formed by, at least in the region of the friction surface region, the reshaping of a metal component. On a second side of the housing component lying opposite to the first side a surface structuring is formed in a region corresponding to the friction surface region by reshaping of the metal component to form the friction surface region.

19 Claims, 5 Drawing Sheets

HOUSING COMPONENT AND FRICTION SURFACE STRUCTURAL ASSEMBLY FOR A HYDRODYNAMIC CLUTCH DEVICE AND METHOD FOR THE PRODUCTION THEREOF

BACKGROUND OF THE INVENTION

1. Field of the Invention

The present invention relates to a housing component for a hydrodynamic clutch device, especially for a hydrodynamic torque converter, having a friction surface region for a converter lock-up clutch of the clutch device being provided on a first side of the housing component positionable or positioned facing the interior of the clutch device.

2. Description of the Related Art

A prior art hydrodynamic torque converter is known from German reference DE 44 23 640 A1, whose housing is assembled from two components. Furthermore, this hydrodynamic torque converter comprises a converter lock-up clutch with a clutch piston which is axially movable in the interior of the converter. Both the clutch piston and the housing lid have friction surfaces positioned to face each other. A clutch plate coupled to a turbine wheel for rotation and possessing respective counter-friction surfaces is arranged between the friction surfaces of the housing lid and the clutch piston and can be clamped therebetween. In such hydrodynamic torque converters, the friction surfaces on the clutch piston and on the housing lid are customarily produced in one machining operation to achieve the necessary surface quality—in other words an optimum surface roughness—in the region of these friction surfaces. The production of these friction surfaces via a machining operation using machining processing is disadvantageous in that it is costly to carry out and in that it results in eventual problems with wear of the clutch plate lining and also problems with the evenness of the friction surfaces that can be achieved.

SUMMARY OF THE INVENTION

It is an object of the present invention to provide a housing component and a frictional surface structural group for a converter lock-up clutch of a hydrodynamic clutch device which has a simple processing operation and produces optimal quality of frictional surfaces.

According to an embodiment of the present invention, the object is achieved by a housing component for a hydrodynamic clutch device, especially for a hydrodynamic torque converter, with a friction surface region for a converter lock-up clutch of the clutch device being provided on a first side of the housing component positionable or positioned facing the interior of the clutch device.

The inventive housing component is formed, at least in the region of the friction surface region, by reshaping of a metal component such that a surface structuring is formed on a second side of the housing component lying opposite to the first side, in a region corresponding to the friction surface region.

According to a first essential aspect of the present invention, the entire housing component bearing the friction surface is formed by the reshaping of a metal component. Therefore, only a simple non-machining processing operation is required. In addition, however, the surface structuring is introduced during this reshaping operation. The surface structuring produces the effect that, during implementation of the reshaping operation of the metal component to form the friction surface region, plastic flow of the material of the metal component arises in the region in which the surface structuring is introduced so that during implementation of the reshaping operation the metal component is given precisely the shape which is to be produced for a defined embodiment of the friction surface. In other words, the reshaping operation is generally an embossing operation.

The surface structuring may, for example, comprise at least one groove-like recessed area extending substantially in the circumferential direction.

If a hydrodynamic clutch device comprises such a housing component, care must be taken to ensure that, when the hydrodynamic clutch device is connected to a drive shaft such, for example, as using what is known as a flexiplate as the connecting member, no deformation of the housing component arises as a result of subsequent processing operations. That is, a welding operation to weld on any anchoring blocks or the like would be very disadvantageous because the heating introduced by a welding operation would distort the housing component which has been precisely shaped. According to another aspect of the present invention, it is proposed that a large number of connecting sections integrally formed thereon for coupling the housing component to a disk-like connecting member are provided on the housing component. For example, it is possible that the connecting sections on the housing component comprise connection projections formed by reshaping of the metal component and capable of being deformed for securely coupling the housing component to the connecting member.

The connection projections are integral parts of the housing component according to the invention which are merely deformed in the manner of a rivet—for example, crushed together—to couple the housing component to the connecting member. Accordingly, the problem does not arise such as in a welding operation, where disproportionate amounts of heat may be introduced which could result in the distortion of the housing component.

Furthermore, the housing component has, in a region provided for connection thereof to a further housing component, a centering section formed by reshaping which generally lies on a radial outer side of the housing component. Here again, the advantage exists that no machining is required for achieving high accuracy of centering in this centering section.

According to a further embodiment, the object of the invention is achieved by a frictional surface structural assembly for a converter lock-up clutch of a hydrodynamic clutch device—more specifically, a hydrodynamic torque converter—comprising a friction surface member which can be brought into contact with a counter-friction surface via a friction surface region provided on a first side of the friction surface member.

In this embodiment, the friction surface member is also formed, at least in the region of the friction surface region, by reshaping a metal component. Furthermore, on a second side of the friction surface member lying opposite to the first side, in a region corresponding to the friction surface region, a surface structuring is formed by the reshaping of the metal component to precisely form the friction surface region.

In the friction surface structural assembly for the converter lock-up clutch, the same advantages are achieved with this form of processing for the accuracy of the friction surfaces thus formed. In addition, the introduction of the surface structuring realized during the implementation of the reshaping operation and induced by plastic deformation of the metal component in this region, increases the rigidity of various components in this region as a result of macroscopic surface structuring itself. In addition, the plastic deformation of the metal component in this region results in the introduction of what are referred to as dislocations in the metal lattice—displacement of various atomic levels relative to one another in the atomic structure of the metal—which become anchored within the metal as a result of the plastic deformation and thus contribute to very high rigidity.

Here again, the surface structuring may, for example, comprise at least one groove-like recessed area extending essentially in the circumferential direction.

To ensure that the friction surface structural assembly is as simple as possible to produce—in other words that essentially no additional and especially no machining processing operations are required—the friction surface member includes a bearing section which is also formed by the reshaping for supporting the friction surface member on a bearing section of a hydrodynamic clutch device.

Furthermore, the friction surface structural assembly may comprise an entraining member which is coupled or can be coupled for mutual rotation to either the friction surface member, a housing component, or a component of a hydrodynamic clutch device connected to the housing component.

In this embodiment, it is again advantageous if a large number of integrally designed coupling projections are provided on the friction surface member and/or the entraining member to connect the friction surface member and the entraining member, respectively, to a respective coupling member. The coupling projections obviate the need for the respective coupling members such, for example, as rivets to be attached by introducing a welding operation or additional members. Here again, provision may be made for the coupling projections to be formed by reshaping and for the coupling projections to be deformed after they are inserted through apertures in the coupling member for securely connecting the entraining member to a coupling member.

The present invention further relates to a hydrodynamic clutch device, especially a hydrodynamic torque converter, which comprises a housing component according to the invention and/or a friction surface structural assembly according to the invention for a converter lock-up clutch.

According to another aspect, the object of the invention is achieved by a method for the production of a housing component for a hydrodynamic clutch device, especially a hydrodynamic torque converter, comprising the steps of:
  a) providing a metal blank such, for example, as a sheet metal blank for the housing component,
  b) reshaping the metal blank to form a friction surface region on a first side of the metal blank, and
  c) forming of a surface structuring preferably containing at least one groove-like recessed area extending essentially in the circumferential direction on a second side of the metal blank lying opposite the first side in a region corresponding to the friction surface region during the step of reshaping thereby effecting a plastic flow of the material of the metal blank and producing dislocations of the structure of the metal blank which become anchored relative to one another and contribute to increases rigidity of the housing lid.

This method according to the invention may further comprise a reshaping step for the formation of at least one connection projection on the second side of the metal blank and/or a reshaping step for the formation of a centering section in a region provided to be connected to a further housing component.

Furthermore, the present invention relates to a method for the production of a friction surface member for a converter lock-up clutch of a hydrodynamic clutch device, especially a hydrodynamic torque converter, comprising the following steps:
  a) providing a metal blank such, for example, as a sheet metal blank for the friction surface member,
  b) reshaping the metal blank to form a friction surface region on a first side of the metal blank, and
  c) forming a surface structuring preferably containing a groove-like recessed area extending substantially in the circumferential direction on a second side of the metal blank lying opposite to the first side in a region corresponding to the friction surface region during the step of reshaping thereby effecting a plastic flow of the material of the metal blank and producing dislocations of the structure of the metal blank which become anchored relative to one another and contribute to increases rigidity of the housing lid.

This method according to the invention may also comprise a step for the formation of at least one coupling projection on a second side of the metal blank lying opposite to the first side.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
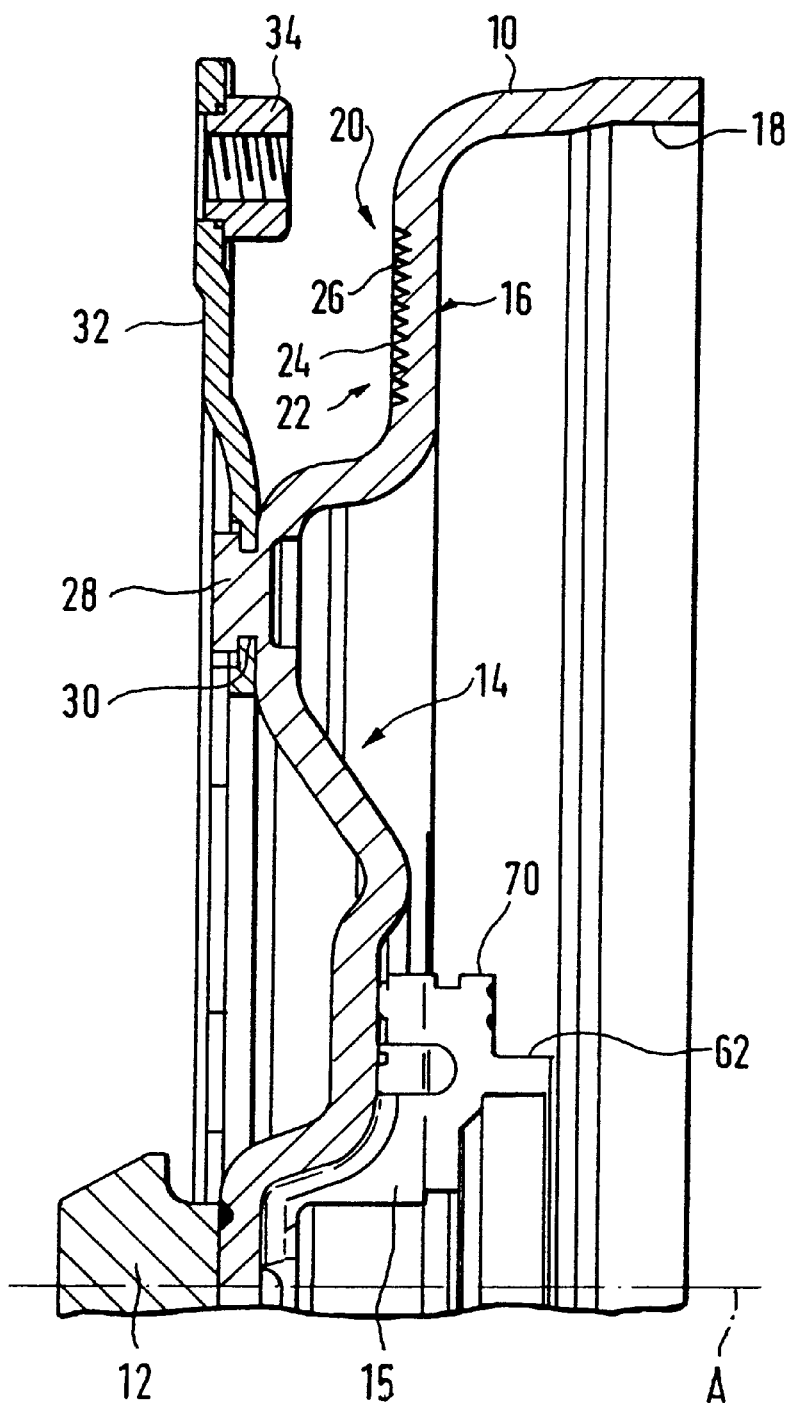
FIG. 1 is a partial longitudinal sectional view of a housing component according to an embodiment of the invention which is connected to a connection member.

Referring to FIG. 1, a housing component according to an embodiment of the present invention, specifically a housing lid 10, is shown which is intended for use in a hydrodynamic torque converter. The housing lid 10 is formed from a sheet metal part and is fixedly connected on a radially inner side with a centering pin 12 via a connection such, for example, as a projection welding. The housing lid 10 has two axial sides respectively comprising an inside 14 for facing the hydrodynamic torque converter and an outside 20. The inside 14 of the housing lid 10 bears both radially and axially on a hub 15 which is formed as a separate component for receiving a piston, to be described below, of a converter lock-up clutch. A radially outer region of the housing lid 10 comprises a friction surface region 16 on which, as will be described below, a counter-friction surface of a converter lock-up clutch comes to bear. A housing lid 10 is arranged radially outside this friction surface region 16. The housing lid 10 has an axially extending section which extends essentially along an axis of rotation A and has a centering region 18 for receiving an impeller cover of the hydrodynamic torque converter bowl or for centering the impeller cover relative to the axis of rotation A. On the outside 20 of the housing lid 10, a radial region 22 is arranged corresponding to the friction surface region 16 comprising a surface structuring 24. This surface structuring 24, as will also be described below, is produced in a reshaping or embossing operation to reshape a metal component to form the housing lid 10. The surface structuring 24 is used to facilitate the formation of the friction surface region 16, which is an annular surface region of the housing lid 10 extending essentially orthogonally to the axis of rotation A, with high precision. The surface structuring 24 comprises, in the form of embodiment shown, a large number of notches or grooves 26 extending essentially in the circumferential direction, but could also comprise any other types of structuring.

A large number of connection projections 28 are provided on the outside 20 of the housing lid 10. The connection projections 28 are also formed integrally on the housing lid 10 during an embossing or reshaping operation. These connection projections 28 are designed to pass through respective passage apertures 30 in a flexible connection plate 32 and then be pressed flat or otherwise deformed on the opposite side of the flexible connection plate 32 to connect the flexible connection plate 32 securely to the housing lid 10. Via this flexible connection plate 32, the housing lid 10 and hence the complete torque converter can then be connected to a drive shaft. To this end, radially externally arranged securing nuts 34 are provided on the flexible connection plate 32 in which fixing screws are introduced to couple the housing lid 10 and/or torque converter to the drive shaft via what is known as a flexiplate.

Figure 5:
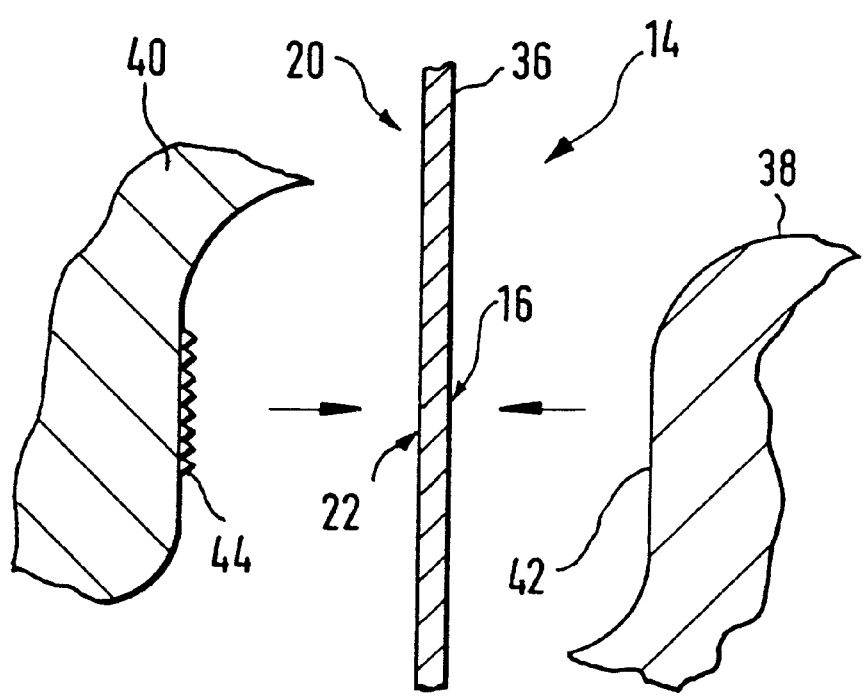
FIG. 5 is a sectional view of a sheet metal blank arranged between two shaping dies showing, diagrammatically, the procedure for the production of a housing component according to an embodiment of the present invention.

The process for producing the housing lid 10, especially the operation for reshaping a metal or sheet metal blank to form the friction surface region 16, is described hereinbelow with reference to FIG. 5. A metal or sheet metal blank 36 is provided to form the friction surface region 16 that is in a flat and undistorted state at least in the region that is intended to form the friction surface region at the start of the operation. The region of the metal or sheet metal blank that is intended to form the friction surface region is arranged between two shaping dies 38, 40, sections of which are shown in FIG. 5, and the two shaping dies 38, 40 are moved toward each other as indicated by arrows. The shaping die 38 directly forms the friction surface region 16. An assigned region 42 of the shaping die 38 which forms the friction surface region 16 is structured as the friction surface is to be structured. In other words, the assigned region 42 is essentially smooth and flat in structure. The other shaping die 40, which comes to bear on the eventual outside 20 of the housing lid 10, comprises a negative image 44 of the surface structuring 24 to be formed in the housing lid 10 in a region 22 corresponding to the friction surface region 16 of the metal blank 36. When the two shaping dies 38, 40 press against each other, this negative image 44 which may, for example, have the shape of blade-like projections running in the circumferential direction, is imprinted into the region 22 of the metal blank 36. This action generates plastic flow of the metal in this material region of the metal blank 36, so that, even though ultimately no substantial reshaping of the metal blank 36 is necessary to form the friction surface region 16, precisely the desired shaping for the friction surface 16 is achieved in this region 16, 22 as a result of the plastic flow of the metal. In addition, the forcible introduction of the surface structuring 24 produces dislocations in the structure of the metal lattice in this region of the housing lid 10 which becoming anchored relative to one another and thus contribute to increased stability of the housing lid in this region.

Since the surface structuring 24 is produced on a side opposite to the friction surface region 16 in the housing lid 10—i.e., the outside 20 of the housing lid 10—the friction surface region 16 may be produced with the desired surface quality which is optimized for the intended operation of the converter lock-up clutch.

In the operation to reshape a metal blank 36 to form the housing lid 10, all the reshaping steps to form the friction surface region 16 or the surface structuring 24, the centering region 18, the connection projections 28 and the radially inward region, which is shaped to match the hub 15 and/or the centering pin 12, may be performed simultaneously. Alternatively, if an embossing tool is used which cannot apply the necessary forces for this simultaneous shaping of the entire housing lid 10, the individual sections may be shaped sequentially. However, even in the sequential shaping, the surface structuring 24 on the outside 20 is produced simultaneously during the shaping or reshaping of the metal blank 36 to form the friction surface region 16.

As a result of this procedure according to the invention, any subsequent processing of the housing lid 10 to provide a friction surface, for example a machining operation or the like, is obviated. A machining operation may also be avoided in the radially outward region, in which the centering section 18 lies, since this centering section 18 is also produced by material reshaping and not by machining, in the same way as the other regions of the housing lid 10.

Figure 2:
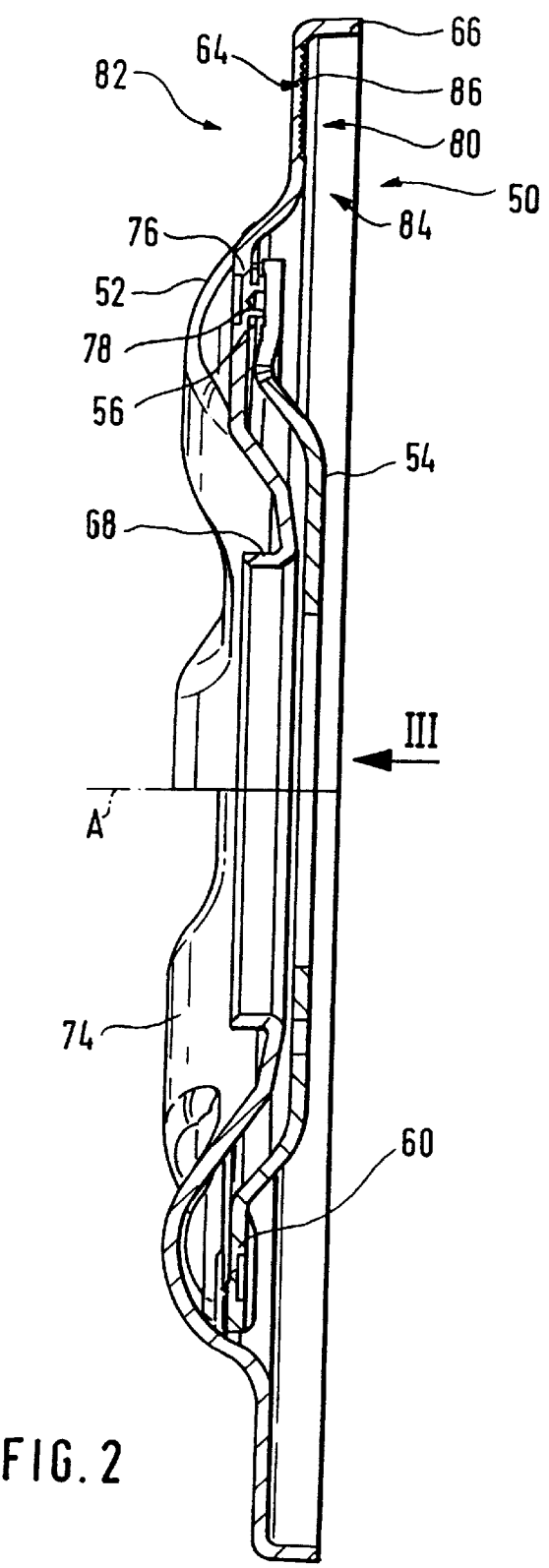
FIG. 2 is a longitudinal sectional view of a piston structural assembly according to an embodiment of the invention for a converter lock-up clutch viewed along line II—II in FIG. 3.
Figure 3:
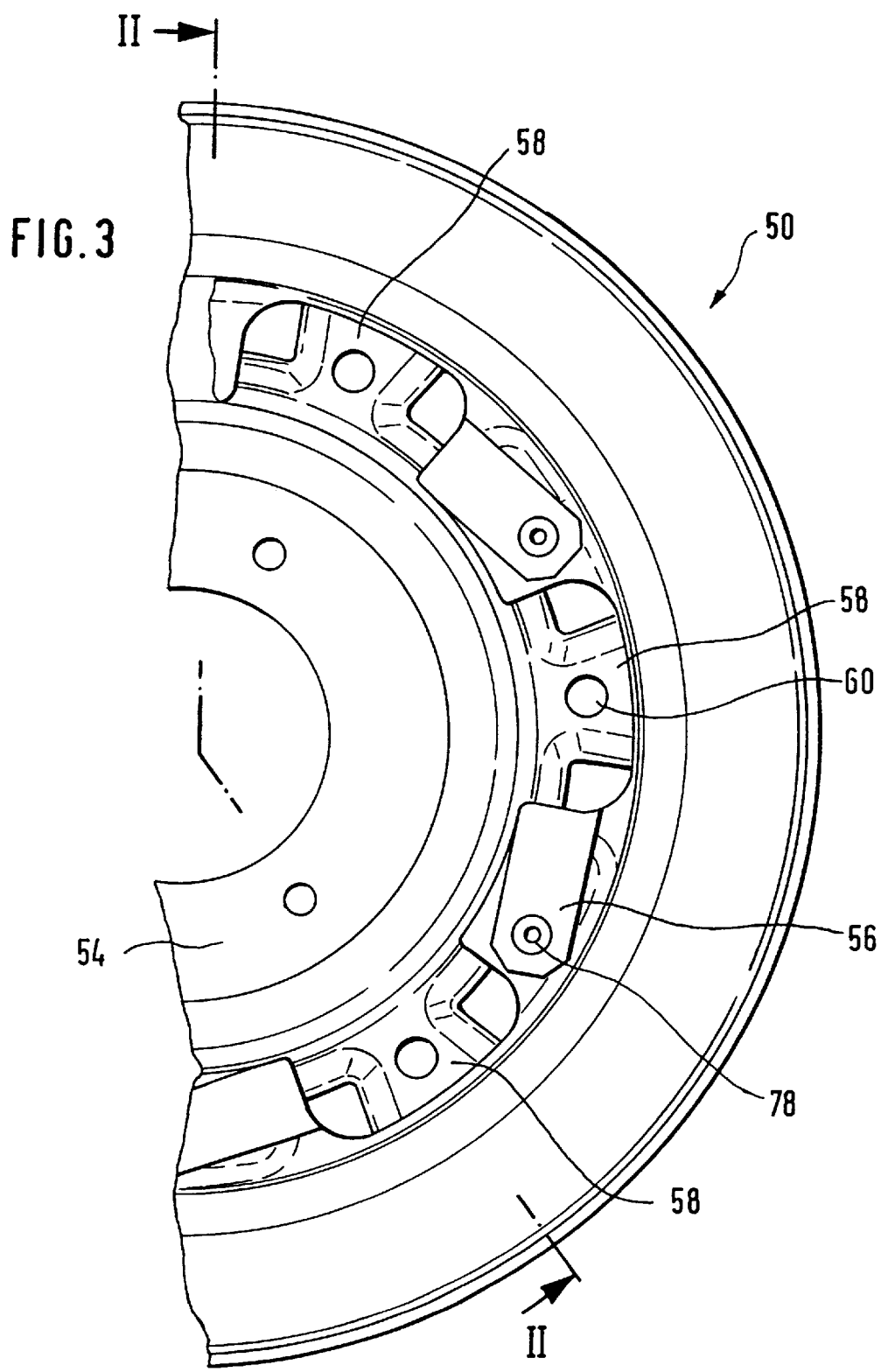
FIG. 3 is a partial axial view of the piston structural assembly shown in FIG. 2 along direction III in FIG. 2.
Figure 4:
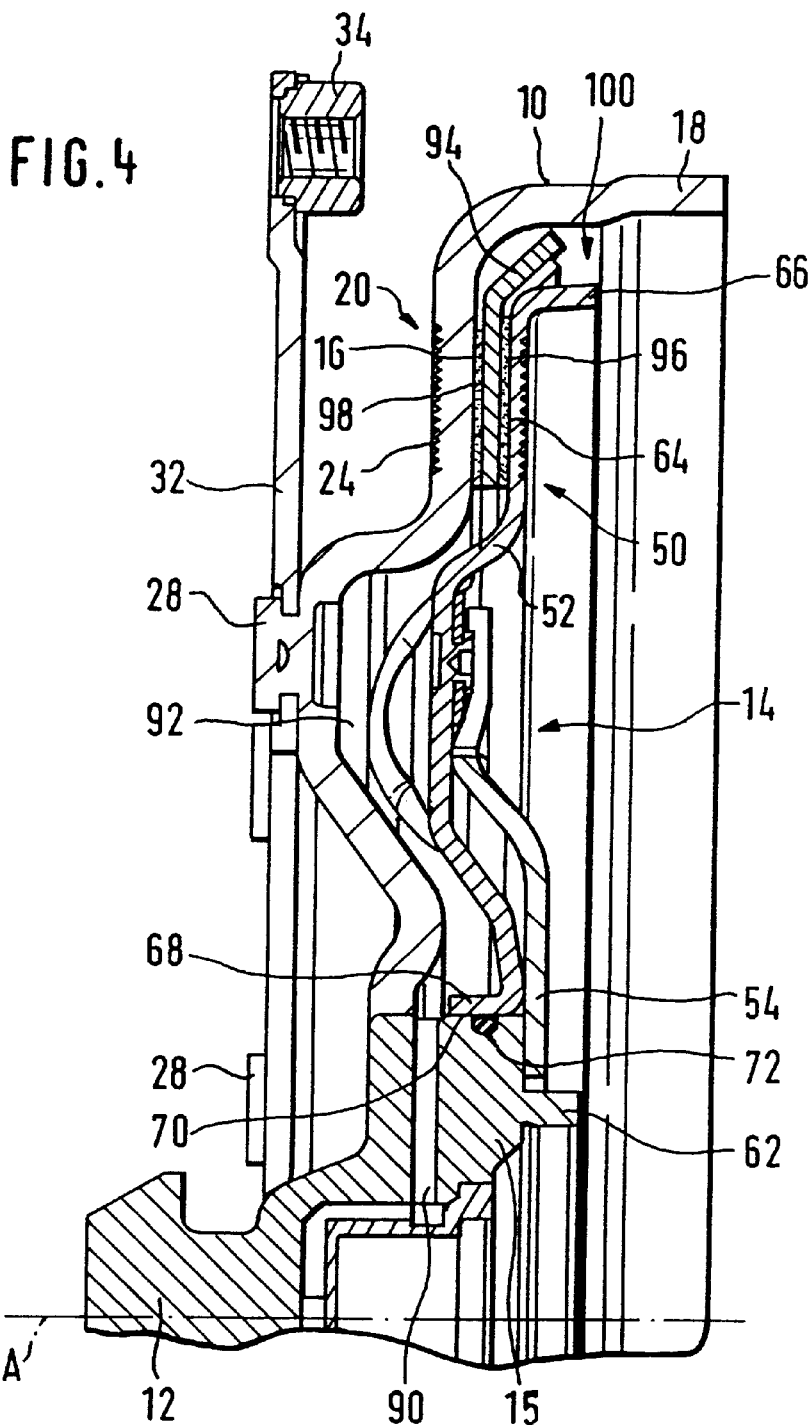
FIG. 4 is a partial longitudinal sectional view of the piston structural assembly shown in FIG. 2 assembled with the housing component of FIG. 1 according to an embodiment of the present invention.

FIGS. 2 and 3 show a further embodiment of the present invention. More specifically, a piston structural group 50 for a converter lock-up clutch which comprises or forms a friction surface structural assembly. The piston structural group 50 comprises a friction surface member 52, hereinafter described as a piston member, an entraining member 54, and a large number of coupling members 56 resembling leaf springs which couple the piston member 52 to the entraining member 54. The entraining member 54 is essentially of disk-like construction and has a plurality of radially outward-projecting projections 58 distributed in the circumferential direction. Each of the projections 58 extends slightly axially outward to increase rigidity. Each of the plural projections 58 comprises at least one coupling projection 60 formed by reshaping. The coupling projection 60 passes through an aperture in an end region of each coupling member 56 and is then pressed flat on the opposite side of the coupling member to fix the coupling member 56 in question to the entraining member 54. The radial inside of the entraining member 54 is positioned on an annular axial projection 62 (see FIG. 1) of the hub 15 of the housing lid 10 and fixed there such, for example, as by welding. This connection is also shown in FIG. 4 which is described in more detail below in which the housing lid 10 is shown in the assembled state with the piston structural group 50.

The piston member 52 has a friction surface region 64 extending essentially orthogonally to the axis of rotation A on its radially outer side which is complementary in shape to the friction surface region 16 of the housing lid 10 and positioned or capable of being positioned opposite thereto.

Radially outside of this friction surface region 64 is an annular axial shoulder 66 on the piston member 52 which serves to stiffen the latter, particularly in the radial outward region. The radial inward region of the piston member 52 has an annular or sleeve-like bearing section 68 whereby the piston member 52 can be positioned on a corresponding bearing surface 70 of the hub 15, which is provided on the housing lid 10, with intermediate mounting of a sealing member 72 resembling an O-ring, so as to be movable in the direction of the axis of rotation A.

A radial central region of the piston member 52 includes circumferentially arranged convex regions 74. A coupling region 76 is arranged between each adjacent pair of convex regions 74. In these coupling regions 76, coupling projections 78 are in turn formed by reshaping of a metal component forming the piston member 52. The coupling projections 78 pass through corresponding apertures in the other end regions of the coupling members 56, and are pressed flat to secure the coupling members on the piston member 52. In this manner, the coupling members 56 form a rotation-proof coupling between the piston member 52 and the entraining member 54. The piston member 52 remains axially movable relative to the entraining member 54 to perform coupling and uncoupling operations. During the axial movement of the piston member 52, distortion of the coupling members 56 resembles leaf springs. The piston member 52 is also fixed via the coupling members 56 and the entraining member 54 to the housing of the torque converter in a manner proof against rotation, specifically via the hub 15 and the housing lid 10. The convex regions 74 have the function of increasing the rigidity of the piston member 52.

Furthermore, side 80 of the piston member 52 which lies opposite the side 82, on which the friction surface region 64 thereof is provided, a surface structuring 86 is again provided in a radial region 84 corresponding to the friction surface region 64 (see especially FIG. 2). This has the same function as previously described with reference to the housing lid 10. The piston member 52 is formable during the operation of reshaping a metal blank in particular to form the friction surface region 64 and the friction surface region is formed with maximum precision and high strength through the plastic distortion of the metal blank in this region 84. The procedure for forming the piston member 52 is precisely the same as described previously with reference to FIG. 5 and the production of the housing lid 10. It should be pointed out that the piston member 52 with all its functional sections— the annular shoulder 66, the friction surface region 64 or surface structuring 86, the convex regions 74 and the coupling regions 76, together with the bearing section or region 68, may be formed from a metal or sheet metal blank in a single reshaping operation. Here again, it is also possible to produce the individual sections or regions in a stepwise reshaping operation, in which case, as already described previously, the surface structuring 86 is introduced during the reshaping of the metal blank to form the friction surface region 64.

The entraining member 54 is also preferably formed from a metal blank so that any machining is dispensed with and production costs are kept low.

It will be observed that, both in the case of the housing lid 10 and in the case of the piston structural assembly 50, no welding operations or the like are required on those components which form the friction surface regions 16 and 64, respectively, to connect any additional components. Instead, the connection is provided by the connection or coupling projections integrally formed on the structural groups. This is of great importance, since it avoids the introduction of additional heat, for example in the implementation of a welding operation after the shaping of the friction surface regions 16, 64, which might result in distortion of the various components and would then nevertheless make reworking by machining or the like necessary. The provision of the connection projections 28 as an integral part of the housing lid and coupling projections 60 and 78 as integral parts of the entraining member 54 and the piston member 52 has the advantage that it is possible to dispense with the introduction of additional rivets or the like, so that the entire production operation can be simplified.

FIG. 4 shows the assembly of the housing lid 10 according to the invention with the piston structural group 50. The entraining member 54 is attached to the hub 15 or its axial projection 62 on the radially inward side in a manner proof against rotation and the piston member 52 is mounted by its bearing section 68 on the surface 70 of the hub 15 to be axially movable. A duct arrangement 90 is provided in the hub 15 through which working fluid may be passed into a space 92 formed between the housing lid 10 and the piston member 52. The working fluid may also be withdrawn from the space 92 to optionally move the piston member 52 to the left, in the view shown in FIG. 4, toward the housing lid 10 and thereby clamp a clutch plate 94 with friction linings 96, 98 between the friction surface 16 of the housing lid 10 and the friction surface region 64 of the piston member 52. The clutch plate 94 is coupled in a known manner to a turbine wheel (not shown), optionally via a torsional vibration damper, for rotation, so that by axial displacement of the piston member 52 the turbine wheel may be selectively coupled in a manner proof against rotation to the housing lid 10 and hence the entire housing. FIG. 4 also shows that the piston structural group 50 and the clutch plate 94 form with the friction surfaces 96, 98 the essential components of a converter lock-up clutch 100 of the torque converter.

As also depicted in FIG. 4, the centering pin 12 is formed integrally with hub 15. This is in contrast to the embodiment in FIG. 1. The housing lid 10 has an aperture in its radially inward region into which the centering pin is inserted and secured such, for example, as by welding. A laser welding operation may be used here, so that despite the fact that this region to be welded is relatively far radially from the friction surface region 16, the heat introduced into the housing lid 10 is minimized.

During assembly of the torque converter, the housing lid 10 is first fixedly connected to the flexible connection plate 32 by the continued reshaping of the connection projections 28 described above, as at this stage a counterbearing on the housing lid 10 can still be supported from the inside 14. After the housing lid 10 is connected to the flexible connection plate 32, the piston structural group 50 introduced into the housing lid 10 and secured therein by welding the entraining member 54 onto the hub 15.

It should additionally be pointed out that, although the preferred intended use of a torque converter for the structural groups according to the invention has been described previously, it is also conceivable to apply this to a hydraulic clutch or any other hydrodynamic clutch device.

The invention is not limited by the embodiments described above which are presented as examples only but can be modified in various ways within the scope of protection defined by the appended patent claims.

We claim:

1. A housing component for a hydrodynamic clutch device having a converter lock-up clutch, comprising:
   a component formed from a substantially planar metal blank having a first side and a second side opposing said first side;

a friction surface region arranged on the first side of said component; and a surface structuring comprising one of a notch and a groove arranged on said second side of said component in a region corresponding to said friction surface region, wherein said friction surface region and said surface structuring are simultaneously formed by reshaping of said component to form said friction surface region and wherein said surface structuring is operatively arranged for producing dislocations in a metal lattice of said component during the reshaping of said metal component which contribute to increased rigidity of said component in said region corresponding to said friction surface region.

2. The housing component of claim 1, wherein said surface structuring comprises at least one groove-like recessed area extending substantially circumferentially.

3. The housing component of claim 1, further comprising a disk-like connecting member and said component comprises a plurality of connecting sections integrally formed thereon for coupling said component to said disk-like connecting member.

4. The housing component of claim 3, wherein said plurality of connecting sections comprise connection projections formed by reshaping said component, said connection projections being deformable for securely coupling said component to said connecting member.

5. The housing component of claim 1, wherein said component comprises a further reshaped region comprising a centering section for connection of said metal blank to a further housing component.

6. A frictional surface structural assembly for a converter lock-up clutch of a hydrodynamic clutch device having a bearing section, comprising:

a piston member having a first side and a second side opposing said first side;

a friction surface region arranged on said first side of said piston member for contacting a counter-friction surface of the converter lock-up clutch; and a surface structuring comprising one of a groove and a notch arranged on said second side of said piston member in a region corresponding to said friction surface region, wherein said friction surface region and said surface structuring are simultaneously formed by reshaping of said piston member to form said friction surface region and wherein said surface structuring is operatively arranged for producing dislocations in a metal lattice of said piston member during the reshaping of said piston member which contribute to increased rigidity of said piston member in said region corresponding to said friction surface region.

7. The friction surface structural assembly of claim 6, wherein said surface structuring comprises at least one groove-like recessed area extending circumferentially.

8. The friction surface structural assembly of claim 6, wherein said piston member further comprises a bearing section for supporting the piston member on the bearing section of the hydrodynamic clutch device.

9. The friction surface structural assembly of claim 6, further comprising an entraining member coupled to said piston member for mutual rotation and connectable with the bearing section of the hydrodynamic clutch device.

10. The friction surface structural assembly of claim 9, further comprising a coupling member connected between said piston member and said entraining member, wherein a plurality of integrally designed coupling projections are arranged on said piston member and on said entraining member for connecting said piston member and said entraining member, respectively, to said coupling member.

11. The friction surface structural assembly of claim 10, wherein said plurality of coupling projections are formed by reshaping and are deformed for securely connecting said piston member and said entraining member to said coupling member.

12. A hydrodynamic clutch device having a converter lock-up clutch, comprising:

a housing component formed from a substantially planar metal blank having a first side and a second side opposing said first side, a first friction surface region for the converter lock-up clutch arranged on the first side of said housing component for facing an interior of said clutch device; and a first surface structuring comprising one of a notch and a groove arranged on said second side of said housing component in a region corresponding to said friction surface region, wherein said first friction surface region and said first surface structuring are simultaneously formed by reshaping of said housing component to form said first friction surface region and wherein said first surface structuring is operatively arranged for producing dislocations in a metal lattice of said housing component during the reshaping of said housing component which contribute to increased rigidity of said housing component in said region corresponding to said first friction surface region; and a friction surface structural assembly for the converter lock-up clutch including a piston member having a first side and a second side opposing said first side, a second friction surface region arranged on said first side of said piston member for contacting the first friction surface, and a second surface structuring comprising one of a notch and a groove arranged on said second side of said piston member in a region corresponding to said second friction surface region, wherein said second friction surface region and said second surface structuring are simultaneously formed by reshaping of said piston to form said second friction surface region and wherein said second surface structuring is operatively arranged for producing dislocations in a metal lattice of said piston member during the reshaping of said piston member which contribute to increased rigidity of said piston member in said region corresponding to said second friction surface region.

13. A method for producing a housing component for a hydrodynamic clutch device, comprising the steps of:

a) providing a metal blank for the housing component having a first and a second side;

b) reshaping the metal blank to form a friction surface region on a first side of the metal blank; and c) forming a surface structuring comprising one of a notch and a groove on the second side of the metal blank lying opposite the first side in a region corresponding to the friction surface region thereby effecting a plastic flow of the material of the metal blank during said step b) and producing dislocations in a metal lattice of said metal blank which contribute to increased stability in the region corresponding to the friction surface region.

14. The method of claim 13, wherein said step c) further comprises forming a surface structuring comprising at least one groove-like recessed area extending circumferentially.

15. The method of claim 13, further comprising the step of reshaping the metal blank to form at least one connection projection on the second side of the metal blank.

16. The method of claim 15, further comprising the step of reshaping the metal blank to form a centering section in a region provided to be connected to a further housing component.

17. A method for producing a friction surface member for a converter lock-up clutch of a hydrodynamic clutch device, comprising the steps of:
   a) providing a metal blank for the friction surface member having a first side and a second side;
   b) reshaping the metal blank to form a friction surface region on the first side of the metal blank; and
   c) forming a surface structuring comprising one of a notch and a groove on the second side of the metal blank lying opposite to the first side in a region corresponding to the friction surface region thereby effecting a plastic flow of the material of the metal blank during said step b) and producing dislocations in a metal lattice of said metal blank which contribute to increased stability in the region corresponding to the friction surface region.

18. The method of claim 17, wherein said step c) further comprises forming a surface structuring comprising at least one groove-like recessed area extending circumferentially.

19. The method of claim 17, further comprising the step of forming at least one coupling projection on the second side of the metal blank.

* * * * *